United States Patent [19]
Yoshiga et al.

[11] Patent Number: 5,024,891
[45] Date of Patent: Jun. 18, 1991

[54] POLYAMIDE RESIN-METAL LAMINATE

[75] Inventors: Norio Yoshiga; Masahiro Kawamura; Hiroshi Nonoyama, all of Nagahama, Japan

[73] Assignee: Mitsubishi Plastics Industries limited, Tokyo, Japan

[21] Appl. No.: 409,317

[22] Filed: Sep. 19, 1989

[30] Foreign Application Priority Data

Mar. 22, 1988 [JP] Japan .................................. 63-67909

[51] Int. Cl.$^5$ ............................................. B32B 27/38
[52] U.S. Cl. ..................................... 428/414; 428/457; 428/474.9; 428/475.5; 428/416
[58] Field of Search ..................... 428/474.4, 457, 458, 428/474.9, 475.5, 414, 416

[56] References Cited

U.S. PATENT DOCUMENTS

| | | | |
|---|---|---|---|
| 3,663,354 | 5/1972 | Ueno et al. | 161/186 |
| 3,993,841 | 11/1976 | Matsubara et al. | 428/475.5 |
| 4,369,222 | 1/1983 | Hedrick et al. | 428/474.4 |
| 4,759,972 | 7/1988 | Yoshiga et al. | 428/215 |

FOREIGN PATENT DOCUMENTS 0234515 9/1987 European Pat. Off. .
1424269 2/1976 United Kingdom .

Primary Examiner—Merrell C. Cashion, Jr.
Assistant Examiner—Don Sumihiro
Attorney, Agent, or Firm—Oblon, Spivak, McClelland, Maier & Neustadt

[57] ABSTRACT

A polyamide resin-metal laminate comprising a metal substrate having a heat-treated epoxy resin coating layer on its surface and a polyamide resin laminated on the coating layer of the substrate, said coating layer having the following surface analytical spectrum values as measured by electron spectroscopy for chemical analysis (ESCA method):

(1) Relative elemental content of carbon element ($C_{1s}$ spectrum): at least 50 atomic %,
(2) Relative contents based on the total content of C=O, C—O, C=C—C=C, CH and C—C functional groups of $C_{1s}$ spectrum, as determined by the respective waveform analyses: C=O group: at least 4.0 atomic %, and C—O group: at most 25 atomic %.

7 Claims, No Drawings

POLYAMIDE RESIN-METAL LAMINATE

The present invention relates to a polyamide resin-metal laminate wherein a polyamide resin is firmly bonded to a metal surface.

A metal laminate having a polyamide resin coated on a metal substrate such as a steel plate or an aluminum plate, is used in various fields by virtue of excellent properties of the polyamide resin such as electrical insulating properties and solvent resistance.

In such a metal laminate, the interlaminar bonding is poor, and therefore it is common to interpose an adhesive agent between the metal substrate and the polyamide resin layer for lamination. As such an adhesive agent, an acrylate resin adhesive agent, an epoxy resin adhesive agent or a polyester adhesive agent is usually employed.

Such an adhesive agent is thermally cured by means of a curing agent, whereby the stiffness of the adhesive layer tends to be high, and the secondary processability such as drawing or bending processability tends to be poor. For example, when a container having a bottom is to be prepared by using a sheet form substrate, the laminate is subjected to multi-step drawing or deep drawing, whereby a compression force, a tensile force and a sharing force will be exerted to the adhesive layer during such processing, and ply separation is likely to take place.

It is an object of the present invention to provide a polyamide resin-metal laminate having excellent interlaminar bonding and being hardly susceptible to ply separation even when subjected to various secondary processings.

To accomplish the above object, in the polyamide resin-metal laminate of the present invention, a heat-treated epoxy resin coating layer having a certain specific elemental composition, is provided on the surface of the metal substrate.

The present invention provides a polyamide resin-metal laminate comprising a metal substrate having a heat-treated epoxy resin coating layer on its surface and a polyamide resin laminated on the coating layer of the substrate, said coating layer having the following surface analytical spectrum values as measured by electron spectroscopy for chemical analysis (ESCA method):

(1) Relative elemental content of carbon element ($C_{1s}$ spectrum): at least 50 atomic %, (2) Relative contents based on the total content of C=O, C—O, C=C—C=C, CH and C—C functional groups of $C_{1s}$ spectrum, as determined by the respective waveform analyses: C=O group: at least 4.0 atomic %, and C—O group: at most 25 atomic %.

Now, the present invention will be described in detail with reference to the preferred embodiments.

As the metal substrate to be used in the present invention, a sheet product such as a steel sheet, a copper sheet, a stainless steel sheet or an aluminum sheet, or products of various shapes such as a rod shape or cylindrical shape, may be employed. Further, a metal substrate with its surface treated by chemical treatment with, e.g. phosphate-chromate or by etching treatment such as electrolytic etching, may be employed.

On the surface of the metal substrate, it is necessary to provide a heat-treated epoxy resin coating layer having the surface analytical spectrum values as measured by electron specroscopy for chemical analysis (ESCA method) being within the above-mentioned specific ranges.

Here, the electron spectroscopy for chemical analysis (ESCA method) is an analytical method whereby the types of elements and the chemical bonding state in the vicinity of the surface of a test sample are analyzed from the spectrum of photoelectrons ejected from the atoms at the surface of the sample upon irradiation with soft X-rays.

The analytical values by the ESCA method of the heat-treated epoxy resin coating layer are required to satisfy the following conditions (1) and (2):

(1) Relative elemental content of carbon element ($C_{1s}$ spectrum): at least 50 atomic %, (2) Relative contents based on the total content of C=O, C—O, C=C—C=C, CH and C—C functional groups of $C_{1s}$ spectrum, as determined by the respective wave form analyses: C=O group: at least 4.0 atomic %, and C—O group: at most 25 atomic %.

Here, the measurement by the above ESCA method may be conducted under usual measuring conditions. For example, the measurement may be made from the distribution of the spectrum intensity of each element and each functional group by letting $C_{1s}$ spectrum change from a bond energy of 296.0 eV to 282 eV at an output of 15 KV×33 mA with the X-ray source being MgKα under a degree of vacuum being $5 \times 10^{-8}$ torr.

With the epoxy resin coating layer satisfying the above conditions (1) and (2), the bonding to the polyamide resin is extremely firm. The reason is not clearly understood, but it is assumed that the C—O group is converted to a C=O group by the ring opening of the epoxy group in the epoxy resin, whereby hydrogen bonding takes place with the amide bond

in the polyamide resin to provide a strong bonding force.

The epoxy resin to be used in the present invention may, for example, be a bisphenol epoxy resin represented by the structural formula:

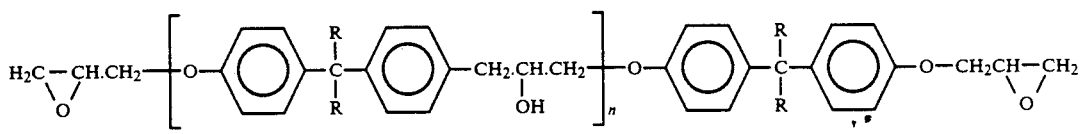

wherein R is an alkyl group, and n≧1. Specifically, it includes bisphenol A monoglycidyl ether and bisphenol A diglycidyl ether. Further, various other epoxy resins including bisphenol F epoxy resins and resorcyloxy resins, may be employed. Such an epoxy resin preferably has a molecular weight of from 300 to 3,000 and an epoxy equivalent of from 150 to 3,200.

Such an epoxy resin is coated on the surface of the metal substrate, followed by heat treatment. The coating method may vary depending upon e.g. the shape of the metal substrate. In the case of a sheet product, the above epoxy resin may be coated by itself or after diluted with a solvent such as methyl ethyl ketone, acetone, toluene, trichlene or 1,1,1-trichloroethane, in a predetermined amount, by a usual coating method such as a gravier roll method, a reverse roll method, a kiss-roll method, an air knife coating method or a dipping method.

The coating amount varies depending upon e.g. the type of the metal substrate. Usually, however, the epoxy resin is coated to have a thickness of from 0.01 to 10 μm, preferably from 0.02 to 7 μm, as the thickness after being dried and solidified. If the thickness is less than 0.01 μm, no adequate bonding force is obtainable, whereby ply separation is likely to occur during the second processing. Likewise, if the thickness exceeds 10 μm, a deterioration in the peel strength will be observed, such being undesirable.

The coated epoxy resin is then subjected to heat treatment to satisfy the above-mentioned spectrum ranges by the ESCA method. The conditions for the heat treatment may suitably be determined so that the spectrum values would be within the above-mentioned ranges. The heat treatment is conducted usually under such condition that the metal substrate coated with the epoxy resin is heated at a temperature of at least 350° C. for at least 3 seconds, preferably from 350° to 450° C. for from 5 to 30 seconds, by e.g. an infrared heater or a dielectric heater.

The polyamide resin used for the metal laminate of the present invention, includes, for example, 6-nylon, 11-nylon, 12-nylon, 66-nylon, 610-nylon, 612-nylon and 6/66 copolymer nylon. Further, a polyamide elastomer and an impact resistant polyamide may be employed. The polyamide elastomer may be composed of a hard segment of e.g. 6-nylon or 66-nylon and a soft segment of e.g. a polyether or polyester. The impact resistant polyamide may be a polyamide polymer alloy obtained by melt-blending e.g. a modified polyolefin to the main component of 66-nylon or 6-nylon resin. The modified polyolefin includes a modified ethylene-propylene-diene copolymer obtained by grafting maleic anhydride to an ethylene-propylene-diene copolymer, and an ionomer resin obtained by ionizing an ethylene-methacrylic acid copolymer with e.g. Na, Zn or Mg.

Then, on the heat-treated epoxy resin coating layer, the above-mentioned polyamide resin is laminated. The lamination method may vary depending upon e.g. the shape of the metal substrate. In the case of a sheet product, the polyamide resin may be coated by a so-called extrusion laminating method by extruding it in the form of a film by an extruder equipped with a die such as a coat hunger die, a T-die or an I-die, or by a method whereby a film preliminarily formed is heat-bonded to the metal sheet heated to a temperature higher than the softening temperature of the film by nip rolls.

The heat bonding in the above described manner is followed by cooling to obtain a desired laminate. An improvement in the peel strength may be obtained by further subjecting the laminate to heat treatment at a temperature at a level of at least the softening temperature of the polyamide resin.

Now, the present invention will be described in further detail with reference to Examples. However, it should be understood that the present invention is by no means restricted by such specific Examples.

EXAMPLES 1 TO 4

As the metal substrate, an aluminum sheet (1,100-H18 material according to JIS H4,000) having a thickness of 0.4 mm subjected to chemical treatment with a phosphate-chromate treating solution, was used. A bisphenol epoxy resin (bisphenol A diglycidyl ether) having a molecular weight of 380 and an epoxy equivalent of from 180 to 200 was dissolved in methyl ethyl ketone and coated by a reverse roll coater on one side of the chemically treated aluminum sheet and dried.

Then, the respective samples were treated under heat treating conditions of at least 250° C. for 15 seconds as identified in Table 1 to obtain the spectrum values as identified in Table 1, respectively. Then, a 6-nylon film (30 μm) was laminated on each aluminum sheet heated to a temperature of at least the melting point of the nylon.

Then, each laminate thus obtained was evaluated with respect to the peel strength under normal condition and the peel strength after deformation. The results are shown in Table 1. The evaluation of the respective items was conducted by the following methods.

Peel strength under normal condition: a test piece with a width of 20 mm was cut out from each aluminum laminate (laminate having a total thickness of 0.50 mm), and the aluminum layer was notched. Then, the test piece was folded back at an angle of 180° C. along the notched line to form a peeling surface. Then, a peeling test was conducted at a peeling rate of 50 mm/min, and the load during the peeling was measured.

Peel strength after deformation: each laminate was stretch-deformed by 20% at a rate of 35 mm/min, and then a test piece was cut out and subjected to a peeling test in the same manner as described above, whereby the load during the peeling was measured.

EXAMPLE 5

The test was conducted in the same manner as in the preceding Examples except that the coated epoxy resin was not subjected to heat treatment.

EXAMPLE 6

The test was conducted in the same manner as in the preceding Examples except that lamination was conducted without interposition of the epoxy resin.

TABLE 1

| | Heat treatment temperature (°C.) | Amount of $C_{1s}$ element (atomic %) | Proportions of functional groups (atomic %) | | Peel strength under normal condition (kg/20 mm width) | Peel strength after deformation (kg/20 mm width) |
| --- | --- | --- | --- | --- | --- | --- |
| | | | C=O | C—O | | |
| 1 | 380 | 81.6 | 5.0 | 24.7 | Not peeled | Not peeled |
| 2 | 400 | 81.9 | 5.2 | 13.6 | Not peeled | Not peeled |
| 3 | 250 | 75.6 | 3.1 | 34.5 | 2.4 | 2.0 |
| 4 | 320 | 80.2 | 3.1 | 25.9 | 3.2 | 2.8 |
| 5 | — | 73.2 | 0.0 | 40.3 | 2.3 | 1.4 |
| 6 | 400 | 24.0 | 0.0 | 0.0 | 2.5 | 1.4 |

It is evident from Table 1 that in Examples 1 and 2 representing the polyamide resin-metal laminate of the present invention, the interlaminar bonding strength is extremely firm and no peeling was observed in either under normal condition or after the deformation. Whereas, in Examples 3 to 6 representing the cases wherein the spectrum intensity is outside the ranges of the present invention, the peel strength is inferior to the present invention.

As described in the foregoing, the polyamide resin-metal laminate of the present invention provides a firm interlaminar bonding and has a merit that it undergoes no ply separation even when subjected to various secondary processings. Therefore, it is useful particularly in the field of electrical materials where insulation is required. It is also useful as a substrate sheet for deep drawing to obtain a casing for an aluminum electrolytic capacitor as disclosed in U.S. Pat. No. 4,759,972.

What is claimed is:

1. A polyamide resin-metal laminate comprising a metal substrate having a heat-treated epoxy resin coating layer on its surface and a polyamide resin laminated on the coating layer of the substrate, said coating layer having been heat treated at a temperature of at least 350° C. for at least 3 seconds prior to lamination with said polyamide resin and having the following surface analytical spectrum values as measured by electron spectroscopy for chemical analysis (ESCA method):

(1) Relative elemental content of carbon element ($C_{1s}$ spectrum): at least 50 atomic %, (2) Relative contents based on the total content of C=O, C—O, C=C—C=C, CH and C—C functional groups of the $C_{1s}$ spectrum, as determined by the respective waveform analyses: C=O group: at least 4.0 atomic %, and C—O group: at most 25 atomic %.

2. The laminate according to claim 1, wherein said coating layer is a layer of an epoxy resin heat-treated at a temperature of from 350° to 450° C. from 5 to 30 seconds.

3. The laminate according to claim 1, wherein the metal substrate is selected from the group consisting of steel, copper, stainless steel or aluminum.

4. The laminate according to claim 1, wherein the epoxy resin of the heat-treated epoxy resin layer is a bisphenol epoxy resin.

5. The laminate according to claim 1, wherein the epoxy resin of the heat-treated epoxy resin layer has a molecular weight of from 300 to 3,000 and an epoxy equivalent of from 150 to 3,200.

6. The laminate according to claim 1, wherein the polyamide resin is a member selected from the group consisting of 6-nylon, 11-nylon, 12-nylon, 66-nylon, 610-nylon, 612-nylon and 6/66-copolymer nylon.

7. The laminate according to claim 1, wherein the polyamide resin is a member selected from the group consisting of a polyamide elastomer and an impact-resistant polyamide.

* * * * *